June 15, 1943. J. F. HENNESSY 2,321,676
BROILER GRILL
Filed June 9, 1941 2 Sheets-Sheet 2
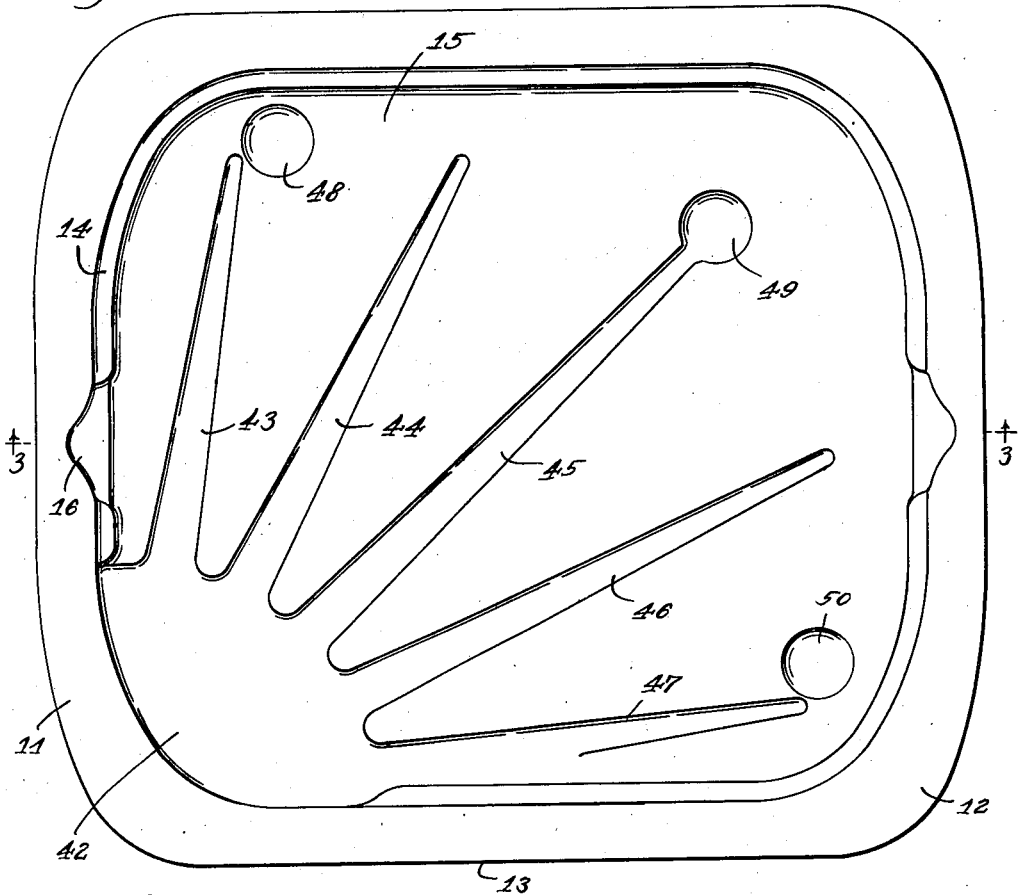
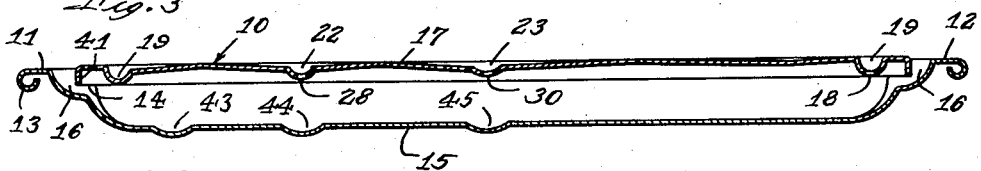
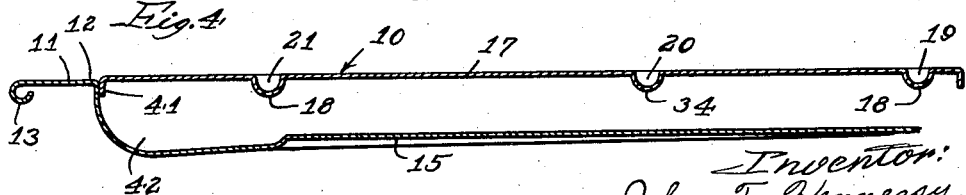
Inventor:
John F. Hennessy
By
McCanna, Wintercorn & Morebach
Attys.

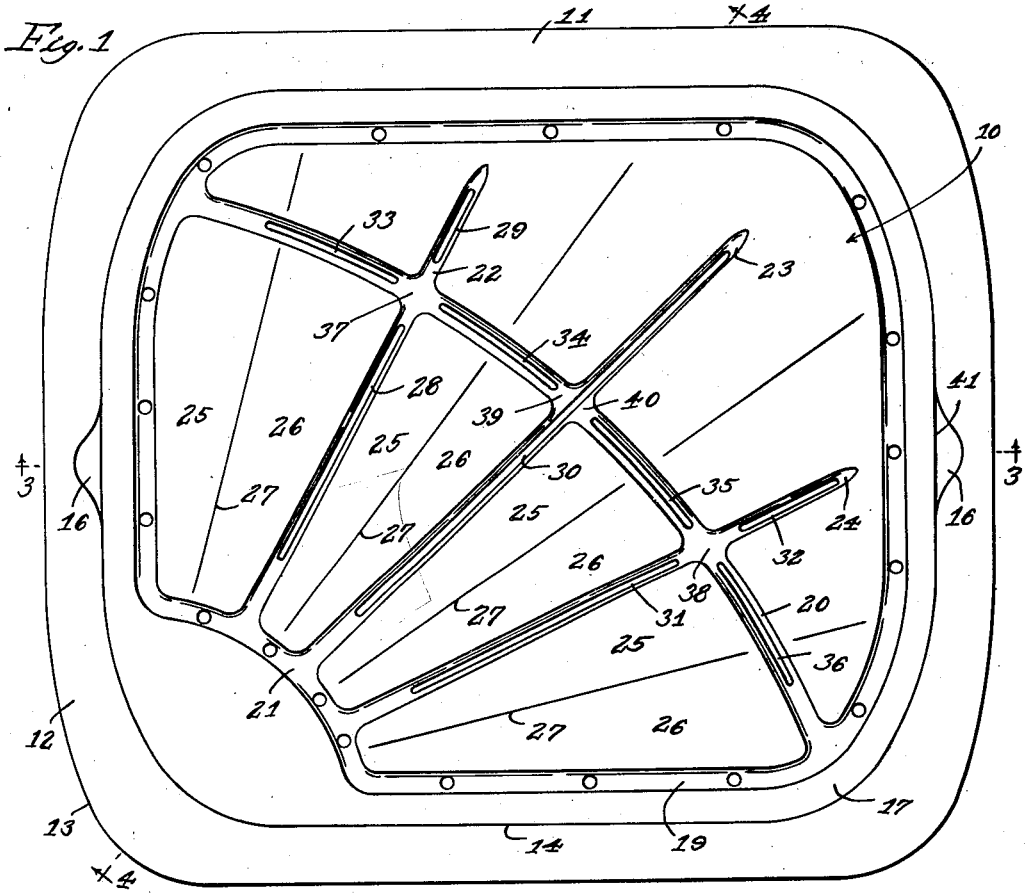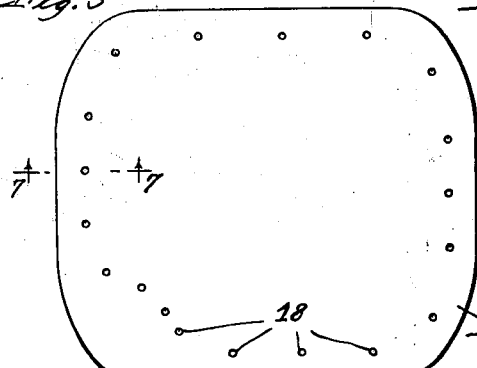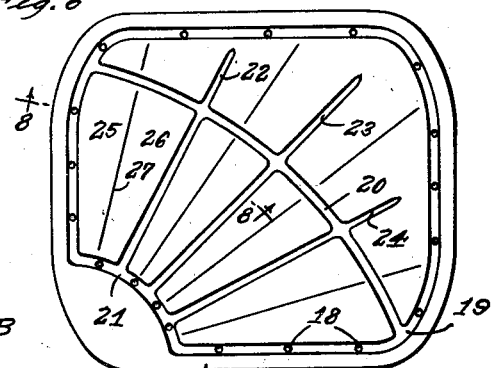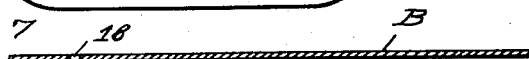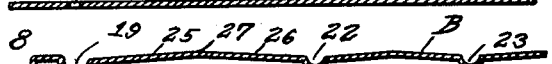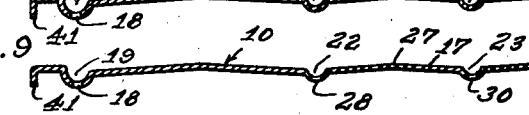

Patented June 15, 1943

2,321,676

UNITED STATES PATENT OFFICE 2,321,676

BROILER GRILL

John F. Hennessy, Rockford, Ill., assignor to Geo. D. Roper Corporation, Rockford, Ill., a corporation of Illinois Application June 9, 1941, Serial No. 397,229

6 Claims. (Cl. 53—5)

This invention relates to a new and improved stamped sheet metal broiler grill.

Stamped sheet metal grills as heretofore constructed have been objectionable because of the extent to which they would warp or distort when the cold meat to be broiled was placed on the hot metal, the distortion in some instances being so great that opposite corners of the grill would curl up as much as an inch or more due to uneven expansion and contraction of the metal in different portions of the grill. It is therefore the principal object of my invention to provide a stamped sheet metal broiler grill constructed so as to compensate within the four corners of the grill for uneven expansion and contraction of different portions so that the grill as a whole remains substantially undistorted and will lie flat in the drip pan.

A salient feature of the present grill is the subdivision of the working area by a combination of elongated slots so that the various sections are free to expand and contract more or less independently of neighboring sections, also the provision between the sections thus separated of connecting web portions of C-shaped cross-section to give an accordion-like action in which these webs form the yielding elements which open and close, so to speak, in the contraction and expansion of the sections connected thereby. The generally rectangular working area of the grill is divided diagonally in both directions by longitudinally slotted groove portions of C-shaped section and is preferably still further sub-divided by other longitudinally slotted groove portions of C-shaped cross-section so that the expansion and contraction of the metal in any portion of the grill is compensated for more or less locally and there is no perceptible overall distortion of the grill.

The invention is illustrated in the accompanying drawings, in which—

Fig. 1 is a top plan view of a broiler grill made in accordance with my invention illustrated supported in a drip pan or serving tray;

Fig. 2 is a top plan view of the drip pan or serving tray with the grill removed;

Fig. 3 is a longitudinal section on the lines 3—3 of Figs. 1 and 2;

Fig. 4 is a fragmentary sectional view on the line 4—4 of Fig. 1, and

Figs. 5 to 9 are views showing different steps in the making of the broiler grill shown in Fig. 1, Fig. 7 being a fragmentary sectional detail on the line 7—7 of Fig. 5, and Fig. 8 being a fragmentary sectional view on the line 8—8 of Fig. 6, Fig. 9 corresponding to Fig. 8 but showing the grill in its final slotted form as in Fig. 1.

The same reference numerals are applied to corresponding parts throughout the views.

The broiler grill of my invention is indicated by the reference numeral 10, and in accordance with the disclosure in the copending application of Stanley H. Hobson, Serial No. 293,115, is adapted to be used interchangeably with a drip pan 11 or a serving tray, the drip pan and serving tray being preferably alike in construction, both stamped from sheet metal with a marginally projecting rim portion 12 having a rolled outer edge 13. Both the drip pan and serving tray provide a circumferential ledge 14 around the depressed central portion 15 to serve as a support for the marginal edge portion of the grill 10, and both the drip pan and tray have the recesses 16 formed in the rim portion 12 at the middle of opposite ends of the pan and tray to permit the housewife to take hold of the opposite ends of the grill conveniently, as, for example, in transferring the grill from the drip pan to the serving tray. The grill is placed in the drip pan 11 for the actual broiling operation in the broiler drawer or oven, at which time the drip pan is supported in the usual way on ledges at the desired elevation beneath the burner. The drip pan 11 is therefore usually porcelain enameled both for cheapness and to make it better adapted to withstand the range temperatures. On the other hand, the serving tray, which is otherwise substantially a duplicate of the drip pan, is of stainless steel or chromium plated steel mainly for attractive appearance in view of its use on the table. Where the grill 10 is chromium plated, the serving tray is usually also chromium plated to match. At the conclusion of the broiling operation, the grill 10 is transferred from the drip pan to the serving tray and carried to the table so as to serve the steak or other meat sizzling hot. The serving tray being cold facilitates the handling of the grill and the carrying thereof to the table and it protects the table against scorching, so that there is no necessity for the use of special pads. The tray furthermore protects the table cloth against grease spots.

The grill 10, in accordance with my invention, has the body 17 thereof formed from a substantially rectangular blank B of sheet metal. A series of holes 18 are punched in circumferentially spaced relation in the marginal portion of the blank at the same time that it is blanked out of the raw stock. Next the blank is placed between forming dies and stamped to substantially its final shape, as appears in Figs. 6 and 8, the holes 18 being in the bottom of the continuous marginaly extending groove 19. There is a substantially diagonally extending arcuate groove 20 formed in the blank in the same operation with the groove 19 and to approximately the same depth. The arcuate corner portion 21 of the marginal groove 19 is struck on an arc, the center of which is approximately at the corner of the blank, and this arcuate groove 21 is substantially concentric with the arcuate groove 20. Radiating from the center of said arcs are three other somewhat shallower grooves 22, 23, and 24 which are of gradually increasing depth toward their inner ends where they communicate with the groove 21. The top of the grill is formed to provide oppositely sloping surfaces 25 and 26 between grooves 19 and 22, between 22 and 23, between 23 and 24, and between 24 and 19. The radial lines 27 mark the intersections of these oppositely sloping surfaces midway between the adjacent grooves. The edges 27 are all in a plane above the laterally sloping surfaces 25 and 26 and grooves 19—24, giving ample opportunity for juices to run down into the grooves. The holes 18 at closely spaced intervals along the grooves 19 and 21 permit quick drainage of these juices so that there is no opportunity for any grease to ignite or cause smoking. The grill when thus blanked, pierced and formed is nearly completed and ready for use. In the final operation, long slots are punched in the grooves 20, 22, 23 and 24, as indicated at 28 and 29 in the groove 22, at 30 in the groove 23, at 31 and 32 in the groove 24, and at 33, 34, 35 and 36 in the groove 20. These slots 28—36 also facilitate drainage of juices, although they are primarily intended to divide the total working area of the grill into a multiplicity of smaller areas in which the metal will be free to expand and contract more or less independently of adjacent sections, the slots furthermore affording clearance spaces between the sections for the necessary give and take. The substantially diagonally extending groove 20 with its slots 33—36 therein divides the working area substantially in half in the one direction and the substantially diagonally extending groove 23 and slot 30 divides the working area substantially in half in another direction, while the halves separated by the groove 23 and slot 30 are further sub-divided by the grooves 22 and 24, each of which grooves has its own slots, as previously stated. The fact that the sheet metal is substantially C-shaped in cross-section at the grooves 19, 20 and 21, as illustrated in Fig. 4, is of importance from the standpoint of giving an accordion-like effect, these C-shaped portions constituting the yieldable elements adapted to open and close in the contraction and expansion of the metal on opposite sides thereof. The C-shaped portions defining the grooves of the series 19—22—23—24—19 in the plane of the line 8—8 of Fig. 6, or in the plane of the line 3—3 of Fig. 1, act in a similar manner to compensate for expansion and contraction of the metal more or less locally so as to prevent any perceptible overall distortion or warpage of the grill. The slots 28—36, of course, add to the yieldability of the C-shaped connecting web portions in the grooves 20, 22, 23 and 24. The slots are, however, located with respect to one another so as not to seriously weaken the grill. For example, the cross-shaped connecting webs 37 and 38 are provided by terminating the slots in spaced relation to the point of intersection of the grooves 20 and 22 at the web 37 and 20 and 24 at the web 38. T-shaped connecting webs 39 and 40 are left on opposite sides of the groove 23 by terminating the slots 34 and 35 in spaced relation to the point of intersection of the grooves 20 and 23. The slot 30 is purposely continued through the connecting web portion, as shown, because of the importance of diagonally dividing the working area to prevent warpage and distortion due to uneven expansion and contraction of the metal. By piercing the long slots 28—36 after the grill has been otherwise completely shaped, I am assured of having all of the slots straight and true. The holes 18, on the other hand, are punched in the flat blank at the outset because of the well known advantage in the punching of holes in flat stock as against curved stock, and furthermore because of the fact that these small round holes are not apt to show any objectionable distortion in the subsequent forming of the grill anyway, the holes being spaced sufficiently far apart, as indicated, to minimize likelihood of any appreciable distortion. Furthermore, the holes punched in the flat blank can be and are used to advantage in the forming operation to locate the blank properly between the forming dies by the entry of dowel pins in certain of the holes. In passing, attention is called to the downwardly projecting marginal flange 41 which serves, first of all, as a reenforcement to lend stiffness to the grill and also serves to improve the appearance of the grill. The lower edge of this flange affords a good grip when lifting the grill out of the drip pan and placing it in the serving tray.

The drip pan 11, and of course the serving tray also, has radiating from the corner juice-collecting well 42 a series of grooves 43—47, the grooves 44, 45, and 46 being in vertical alignment with the grooves 22, 23 and 24, respectively, to catch drippings from the slots 28—32 in said grooves. The grooves 43—47 increase in width and depth toward their inner ends where they communicate with the well, as indicated by the flaring thereof, whereby to assure good drainage of juices into the well. Depressed portions 48, 49, and 50 are in the vicinity of three corners of the pan and cooperate with the depressed well portion 43 at the fourth corner to provide supporting feet in a common plane so that the pan or tray will set level on a table or other supporting surface. With the construction herein disclosed, it is obvious that the greases are protected from the flame of the broiler burner so that they won't ignite or smoke, that being one of the principal objections to many other grills with which I am familiar.

It is believed the foregoing description conveys a good understanding of the objects and advantages of my invention. The appended claims are drawn with a view to covering all legitimate modifications and adaptations.

I claim:

1. A broiler grill comprising a substantially flat sheet metal body of generally rectangular form, the sheet metal of said body being formed to provide a plurality of substantially radial groove portions radiating from one corner of the body, and a substantially diagonally extending groove portion in crisscross relation to the radial groove portions, the sheet metal in the groove portions being substantially C-shaped in cross-section and relatively thin and flexible, whereby to minimize over-all distortion of the grill in the event of difference in expansion and contraction of different portions thereof.

2. A grill as set forth in claim 1, wherein the radially and diagonally extending groove portions have elongated slots provided therein extending longitudinally in the bottoms thereof but terminating short of the points of intersection of said grooves, said slots permitting drainage of juices from the grooves, but being elongated sufficiently in relation to the length of said groove portions to appreciably increase flexibility of said C-shaped groove portions.

3. A grill as set forth in claim 1, wherein the radially and diagonally extending groove portions have elongated slots provided therein extending longitudinally in the bottoms thereof, said slots permitting drainage of juices from the grooves but being elongated sufficiently in relation to the length of said groove portions to appreciably increase flexibility of said C-shaped groove portions, the slots in all but one of said groove portions terminating short of the points of intersection of said grooves and the slot in the longest one of said radial groove portions extending in one continuous length the major portion of the length of said groove through the point of intersection with the diagonally extending groove.

4. A broiler grill comprising a substantially flat sheet metal body of generally rectangular form, the sheet metal of said body being formed to provide a continuous generally rectangular groove in the marginal portion thereof, the sheet metal of said body being further formed to provide a plurality of substantially radial groove portions radiating from one corner of the body, and a substantially diagonally extending groove portion in crisscross relation to the radial groove portions, said radially extending groove portions communicating at least at one end with the marginal rectangular groove and the diagonally extending groove portion communicating at both ends with the marginal rectangular groove, the sheet metal in all said groove portions being substantially C-shaped in cross-section and relatively thin and flexible, whereby to minimize over-all distortion of the grill in the event of difference in expansion and contraction of different portions thereof.

5. A broiler grill comprising a generally flat metal plate presenting a top surface to receive directly on it the food to be broiled, said plate being adapted to be supported by the outer edge portions thereof during the broiling of the food, said top surface being defined by a plurality of spaced apart plate portions in substantially coplanar relation joined by resilient longitudinally slotted trough portions adapted to collect and drain juices drained from the plate portions and also adapted to give transversely so as to permit relative movement between the plate portions in the uneven expansion and contraction of said plate portions when heated in use.

6. A broiler grill comprising a generally flat metal plate presenting a top surface to receive directly on it the food to be broiled, said plate being adapted to be supported by the outer edge portions thereof during the broiling of the food, said top surface being defined by a plurality of spaced apart plate portions in substantially coplanar relation joined by resilient longitudinally slotted trough portions, some of which are in substantially right angle relation to one another, the trough portions being adapted to collect and drain juices drained from the plate portions and also adapted to give transversely so as to permit relative movement between the plate portions in all directions relative to said grill in the uneven expansion and contraction of said plate portions when heated in use.

JOHN F. HENNESSY.